US010003273B2

(12) United States Patent
Takubo

(10) Patent No.: US 10,003,273 B2
(45) Date of Patent: Jun. 19, 2018

(54) POWER CONVERSION DEVICE

(71) Applicant: FUJI ELECTRIC CO., LTD., Kanagawa (JP)

(72) Inventor: Hiromu Takubo, Kanagawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days. days.

(21) Appl. No.: 14/772,411

(22) PCT Filed: May 13, 2014

(86) PCT No.: PCT/JP2014/062740
§ 371 (c)(1),
(2) Date: Sep. 3, 2015

(87) PCT Pub. No.: WO2014/192540
PCT Pub. Date: Dec. 4, 2014

(65) Prior Publication Data
US 2016/0036342 A1 Feb. 4, 2016

(30) Foreign Application Priority Data

May 30, 2013 (JP) ................................. 2013-114721

(51) Int. Cl.
*H02M 5/458* (2006.01)
*H02M 7/48* (2007.01)
(Continued)

(52) U.S. Cl.
CPC .......... *H02M 5/458* (2013.01); *H02H 7/1225* (2013.01); *H02M 7/48* (2013.01); *H02M 2001/008* (2013.01); *H02M 2001/325* (2013.01)

(58) Field of Classification Search
CPC ...... H02H 7/1225; H02M 5/458; H02M 7/48; H02M 2001/008; H02M 2001/325;
(Continued)

(56) References Cited

U.S. PATENT DOCUMENTS 6,396,721 B1    5/2002  Sonoda et al.
7,057,361 B2 *  6/2006  Kitahata ............... H02M 5/458
                                                                    318/139
(Continued)

FOREIGN PATENT DOCUMENTS

CN    102739126    10/2012
CN    102958745     3/2013
(Continued)

OTHER PUBLICATIONS

Written Opinion dated Apr. 29, 2016 in corresponding Singapore patent application No. 11201506921W.
(Continued)

*Primary Examiner* — Emily P Pham
*Assistant Examiner* — Shahzeb K Ahmad
(74) *Attorney, Agent, or Firm* — Wenderoth, Lind & Ponack, L.L.P.

(57) ABSTRACT

Semiconductor switch elements are individually inserted between a plurality of power conversion units provided in parallel with each other through a DC link portion and a DC power supply unit for supplying DC power to each of the power conversion units to restrict the DC power supplied to the respective power conversion units. A control circuit monitors a short-circuit current occurring in each of the power conversion units and turns off the semiconductor switch element connected to the power conversion unit where the short-circuit current flows to stop the power supplied to the power conversion unit.

5 Claims, 3 Drawing Sheets

(51) Int. Cl.
*H02H 7/122* (2006.01)
*H02M 1/00* (2006.01)
*H02M 1/32* (2007.01)

(58) Field of Classification Search
CPC .......... H02M 7/42; H02M 7/44; H02M 7/483; H02M 7/49; H02M 7/493; H02M 7/515; H02M 7/521; H02M 1/32; H02M 1/36; H02M 7/5387
See application file for complete search history.

(56) References Cited

U.S. PATENT DOCUMENTS

| | | | | |
|---|---|---|---|---|
| 8,682,520 | B2* | 3/2014 | Yamada | B60L 3/003 701/22 |
| 8,796,972 | B2 | 8/2014 | Wichert et al. | |
| 2003/0086231 | A1 | 5/2003 | Asaeda et al. | |
| 2004/0141347 | A1* | 7/2004 | Naito | H02M 7/003 363/132 |
| 2006/0226703 | A1 | 10/2006 | Schreiber | |
| 2010/0142235 | A1 | 6/2010 | Asai | |
| 2012/0249027 | A1 | 10/2012 | Wichert et al. | |
| 2013/0110337 | A1 | 5/2013 | Kondoh | |
| 2014/0240872 | A1* | 8/2014 | Nomura | H02M 3/156 361/18 |

FOREIGN PATENT DOCUMENTS

| | | |
|---|---|---|
| CN | 103003090 | 3/2013 |
| CN | 103107769 | 5/2013 |
| EP | 2 594 424 | 5/2013 |
| JP | 52-115323 | 9/1977 |
| JP | 57-135684 | 8/1982 |
| JP | 62-110481 | 5/1987 |
| JP | H05-30793 | 2/1993 |
| JP | 2006-296192 | 10/2006 |
| JP | 2007-181331 | 7/2007 |
| JP | 2009-296844 | 12/2009 |
| JP | 4726624 | 7/2011 |
| JP | 4802153 | 10/2011 |
| TW | 575990 | 2/2004 |
| WO | 2012/002082 | 1/2012 |

OTHER PUBLICATIONS

Office Action dated Aug. 11, 2017 in Taiwanese Patent Application No. 103118807 with English translation.
Japanese Office Action dated Jul. 4, 2017 in Japanese Patent Application No. 2013-114721. (English Translation).
Chinese Search Report dated Dec. 26, 2016 in Chinese Patent Application No. 201480012532.5, with English translation.
Chinese Search Report dated Jan. 19, 2018 in Chinese Patent Application No. 201480012532.5, with English translation.

* cited by examiner

POWER CONVERSION DEVICE

TECHNICAL FIELD

The present invention relates to a power conversion device which rapidly disconnects a defective power conversion unit among a plurality of power conversion units provided in parallel with each other from a DC power supply unit supplying DC power to each of the power conversion units to continue to operate the other faultless power conversion unit.

BACKGROUND ART

As a power source device which drives a large AC load such as a motor or drives a plurality of AC loads in parallel by using a DC power source as a power source, a power conversion device where a plurality of power conversion units are provided in parallel with each other is used. FIG. 3 is a schematic configurational diagram illustrating such a type of the power conversion device, and the reference numeral 1 denotes a DC power supply unit. The DC power supply unit 1 is configured with, for example, a diode circuit to rectify and smooth a commercial AC power source, a battery, or the like.

In addition, the reference numeral 2 (2a to 2n) denotes a plurality of power conversion units which are connected to the DC power supply unit 1 through a DC link portion 3 to be provided in parallel with each other. Each of the power conversion units 2 (2a to 2n) is configured with an inverter unit which converts the DC power supplied from the DC power supply unit 1 to AC power and outputs the AC power. For example, output terminals 4 (4a to 4n) of the power conversion units 2 (2a to 2n) are connected in parallel to be used as power output terminals for a large AC load. Alternatively, a plurality of AC loads are individually connected to the output terminals 4 (4a to 4n) of the plurality of the power conversion units 2 (2a to 2n).

FIG. 3 illustrates an example of a configuration of the power conversion unit 2a. Each of the power conversion units 2 (2a to 2n) is provided with three sets of half-bridge circuits which are configured, for example, by connecting six semiconductor switching elements Q1 to Q6 consisting of insulated-gate bipolar transition (IGBTs) or the like in such a manner that every two semiconductor switching elements are connected in series and inserted between a positive electrode and a negative electrode of the DC input terminal in parallel with each other. Each of the semiconductor switching elements Q1 to Q6 is driven to be alternatively turned on and off with a predetermined phase difference for each half-bridge circuit to switch a DC voltage applied to the half-bridge circuit. In addition, each of the power conversion units 2 (2a to 2n) is configured to connect serial connection points which are central points of the half-bridge circuits to the output terminals 4 (4a to 4n) so as to output a three-phase AC power having a predetermined voltage.

In addition, the reference letters D1 to D6 denote freewheeling diodes which are connected in reverse parallel with the respective semiconductor switching elements Q1 to Q6. In addition, the reference numeral 5 denotes a condenser which is arranged between the DC input terminals of each of the power conversion units 2 (2a to 2n) to stabilize the DC voltage applied to the power conversion unit 2 (2a to 2n). In addition, the reference numeral 6 denotes a control circuit which controls the semiconductor switching elements Q1 to Q6 to be turned on and off as described above. The power conversion device having such a configuration is described in detail, for example, in Patent Document 1 or the like.

In Patent Document 1 described above, switches 7 using mechanical contacts are provided as circuit breakers in the DC input portions of the plurality of the power conversion units 2 (2a to 2n). Furthermore, Patent Document 1 discloses a configuration where DC reactors 8 are installed in the DC link portion 3 with respect to the DC power supply unit 1. When a defect such as a short-circuit occurs in any one of the power conversion units 2 (2a to 2n), the switch 7 disconnects the defective power conversion unit 2 (2a to 2n) from the DC power supply unit 1. By doing so, only the remaining faultless power conversion units 2 (2a to 2n) can be operated.

However, until the defective power conversion unit 2 (2a to 2n) is disconnected by the switch 7, an excessive current flows from the other faultless power conversion units 2 (2a to 2n) to the short-circuit point of the defective power conversion unit 2 (2a to 2n). Due to the excessive current flow, the other faultless power conversion units 2 (2a to 2n) may fall into an excessive current state. The DC reactors 8 have a function of preventing the faultless power conversion units 2 (2a to 2n) from falling into the excessive current state by restricting the rise of the current flowing in the other faultless power conversion units 2 (2a to 2n) at the time of occurrence of the short-circuit fault.

CITATION LIST

Patent Document

Patent Document 1: JP4726624B2

SUMMARY OF THE INVENTION

Problem to be Solved by the Invention

However, in a case where the DC reactors 8 are inserted in the DC link portions 3, the response characteristics of the power conversion units 2 (2a to 2n) are deteriorated. In other words, the responsiveness to the change of the input DC voltage at the normal operation time of the power conversion units 2 (2a to 2n) is deteriorated. Moreover, an operation response delay of the switch 7 is typically in the order of milli-seconds, and thus, the responsiveness to the short-circuit fault is not so high.

The invention has been made in consideration of such circumstances, and an object thereof is to provide a power conversion device having a simple configuration and high responsiveness by rapidly disconnecting a defective power conversion unit among a plurality of the power conversion units which are provided in parallel with each other from a DC power supply unit so that the other faultless power conversion units can continue to be operated.

Means for Solving Problem

In order to achieve the object, according to an aspect of the invention, there is provided a power conversion device including a DC power supply unit and a plurality of power conversion units which are provided in parallel with each other through a DC link portion to convert DC power supplied from the DC power supply unit to AC power and output the AC power.

Particularly, the power conversion device according to the invention includes a plurality of semiconductor switch elements which restrict power supplied to each power conversion unit. The semiconductor switch elements are individually interposed between each power conversion unit and the DC power supply unit, and the semiconductor switch element which is connected to the power conversion unit where a short-circuit current flows is controlled to be turned off by a control circuit which monitors the short-circuit current occurring in each power conversion unit to stop the power supplied to the power conversion unit.

In addition, the control circuit is configured to control the semiconductor switch element to be turned off by detecting, for example, the following current: a current supplied from the DC power supply unit to the power conversion unit, a current flowing in the semiconductor switching elements constituting a main body of the power conversion unit, or a short-circuit current caused by short-circuit fault of the power conversion unit due to a decrease in a DC voltage applied to the semiconductor switching element.

In addition, the DC power supply unit is configured with, for example, a voltage-control-type PWM converter which generates a predetermined DC voltage by using semiconductor switching elements such as IGBTs or MOS-FETs. Further, each of the power conversion units is configured with, for example, an inverter unit which generates a three-phase AC power. Furthermore, the semiconductor switch element is configured with, for example, an IGBT with which a diode is in reverse parallel or a reverse conducting IGBT which allows a current to flow bidirectionally. In addition, the semiconductor switch element is inserted in at least one of a positive electrode side and a negative electrode side of a DC input portion of each of the power conversion units.

Effect of the Invention

According to the power conversion device having the above-described configuration, element characteristics each of the semiconductor switch elements interposed between the power conversion units and the DC power supply unit can be effectively utilized to restrict power, particularly, a current supplied to a respective one of the power conversion units. Therefore, it is possible to effectively prevent an excessive current from unintentionally flowing in the semiconductor switching elements constituting each of the power conversion units.

In addition, in a case where a short-circuit fault occurs in one of the power conversion units, the respective semiconductor switch element connected to that power conversion unit where the fault occurs is controlled to be turned off under the control of the control circuit, so that the power conversion unit can be rapidly disconnected from the DC power supply unit. Furthermore, since the response delay of the semiconductor switch element is typically in the order of micro-seconds, in comparison with the case of the related art where a general switch using a mechanical contact is used as a circuit breaker, the power conversion unit where the fault occurs can be disconnected from the DC power supply unit at a sufficiently high speed.

Therefore, according to the power conversion device according to the invention, unlike the device of the related art where the DC reactors are provided to the DC input portion of the power conversion units, the problem of the operation response delay does not occur in the power conversion units in the normal state. In addition, since there is no need for a DC reactor, its inductance value needs not to be adjusted, and the operation responsiveness of each power conversion unit can be sufficiently fast.

In addition, at the time of detection of the short-circuit current in the power conversion unit, only by controlling the semiconductor switch element to be turned off, the power conversion unit where the short-circuit fault occurs can be rapidly disconnected from the DC power supply unit. Therefore, the other, faultless power conversion unit 9 can continue to be operated stably without causing the above-described problem of an excessive current. Accordingly, by using the semiconductor switch elements having a current restriction function and a DC link circuit disconnection function, the whole configuration of the power conversion device can be simplified while securing the operation characteristics, and thus, it is possible to obtain excellent practical effects in terms that the faultless power conversion units can continue to operate.

DESCRIPTION OF PREFERRED EMBODIMENTS

Hereinafter, power conversion devices according to embodiments of the invention will be described with reference to the drawings.

Figure 1:
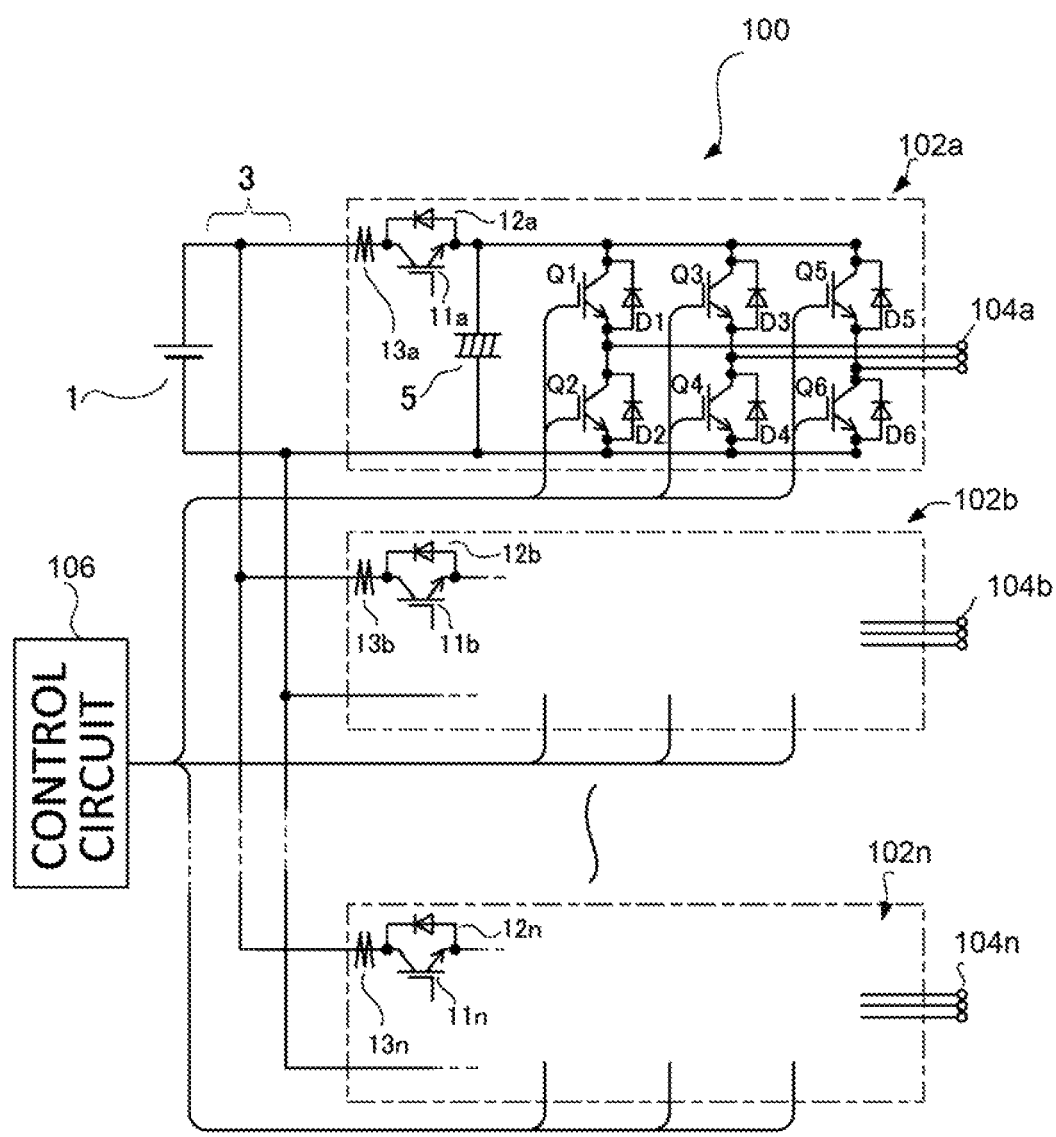
FIG. 1 is a schematic configurational diagram illustrating main components of a power conversion device according to an embodiment of the invention.
Figure 3:
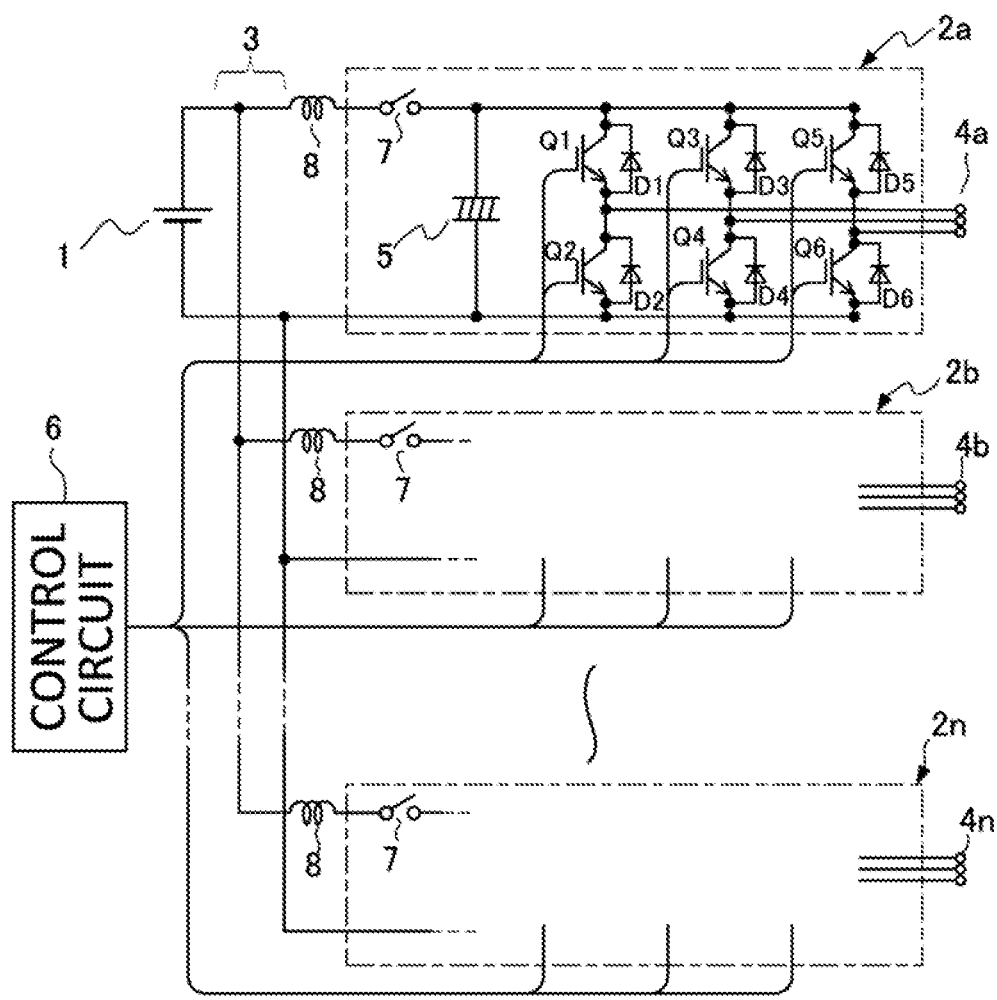
FIG. 3 is a schematic configurational diagram illustrating main components of a power conversion device of the related art.

FIG. 1 is a diagram illustrating a schematic configuration of main components of a power conversion device 100 according to an embodiment of the invention. Unless otherwise indicated, the same components as those of the power conversion device of the related art illustrated in FIG. 3 are denoted by the same reference numerals. In addition, redundant description of the components denoted by the same reference numerals is omitted. Further, in the embodiment, the DC power supply unit 1 can be realized, for example, as a voltage-control type PWM converter or the like which switches a DC input voltage by using semiconductor switching elements such as IGBTs or MOS-FETs to generate a predetermined DC output voltage.

As a feature of the power conversion device 10 according to the embodiment, semiconductor switch elements (11a to 11n) configured with, for example, IGBTs are installed as circuit breakers in series with respective DC input portions of the plurality of the power conversion units 102 (102a to 102n) which are arranged in parallel with each other. Diodes 12 (12a to 12n) are connected in reverse parallel with respective semiconductor switch elements 11 (11a to 11n). The diodes 12 (12a to 12n) have a function of flowing an AC cross current component superimposed on the DC power caused by a delay of a switching operation of the above-described switching elements Q1 to Q6, variations of the components of the power conversion units 102 (102a to 102n) or the like.

Herein, the example where each of the semiconductor switch elements 11 (11a to 11n) is inserted in series with a positive electrode side of the DC input portion of the respective power conversion unit 2 (2a to 2n) is illustrated. However, each of the semiconductor switch elements 11 (11a to 11n) may instead be inserted in series with a negative electrode side of the DC input portion of the respective power conversion unit 102 (102a to 102n). In addition, as the semiconductor switch elements 11 (11a to 11n), reverse conducting IGBTs allowing current to flow bidirectionally may be used.

In addition, in a case where the power conversion units 102 (102a to 102n) have no abnormality, that is, in a case where the power conversion units 102 (102a to 102n) operate normally, the semiconductor switch elements 11 (11a to 11n) are controlled to be turned on under the control of the control circuit 106. Therefore, the DC power supplied from the DC power supply unit 1 through the DC link portion 3 is applied to each of the power conversion units 102 (102a to 102n) through the respective semiconductor switching elements 11 (11a to 11n).

The maximum current of the DC current which flows into the power conversion units 102 (102a to 102n) through the turned-on semiconductor switch elements 11 (11a to 11n) is restricted according to the element characteristics of the respective semiconductor switch elements 11 (11a to 11n). Therefore, the DC power applied to the respective half-bridge circuit constituting the main body of each of the power conversion units 102 (102a to 102n) is restricted. Therefore, if a defect such as a short-circuit does not occur in the semiconductor switching elements Q1 to Q6 constituting the half-bridge circuits, an excessive current does not flow in each of the half-bridge circuits.

However, when a defect such as a short-circuit occurs in the semiconductor switching elements Q1 to Q6, a terminal voltage of the condenser 5 is applied to the DC input portion of the power conversion unit 102 (102a to 102n), that is, a so-called DC link voltage is decreased. According to the decrease in the terminal voltage, a short-circuit current of which the current value is abnormally large flows from the DC power supply unit 1 to the power conversion unit 102 (102a to 102n). The control circuit 6 monitors the occurrence of the short-circuit current through, for example, current detectors 13 (13a to 13n) provided to the DC input portions.

When the short-circuit current is detected, the control circuit 6 controls the semiconductor switch elements 11 (11a to 11n) in the power conversion unit 102 (102a to 102n) where the short-circuit current is detected to be turned off. Therefore, the control circuit 106 blocks the DC power which is to be supplied from the DC power supply unit 1 to that short-circuiting power conversion unit 102 (102a to 102n). Due to the control of the semiconductor switch elements 11 (11a to 11n) to be turned off, the power conversion unit 102 (102a to 102n) where the short-circuit fault occurs is disconnected from the DC power supply unit 1. The disconnection of the power conversion unit 102 (102a to 102n) from the DC power supply unit 1 depends on element characteristics of the semiconductor switch elements 11 (11a to 11n), and the disconnection is rapidly performed, for example, only with a response delay which is in the order of micro-seconds.

Therefore, before the aforementioned abnormal current flows in the other, faultless power conversion units 102 (102a to 102n) caused by the short-circuit fault, the power conversion unit 102 (102a to 102n) where the short-circuit fault occurs is disconnected. Accordingly, the excessive current caused by the short-circuit fault does not flow in the other, faultless power conversion units 102 (102a to 102n). In addition, if the excessive current caused by the short-circuit fault were to flow in the other faultless power conversion units 102 (102a to 102n), the current restriction is performed by the above-described semiconductor switch elements 11 (11a to 11n). By doing so, the occurrence of the excessive current in the faultless power conversion units 102 (102a to 102n) is prevented in advance. Accordingly, the power conversion unit 102 (102a to 102n) where the short-circuit fault occurs is disconnected, and the other remaining faultless power conversion units 102 (102a to 102n) can continue to be stably operated.

In particular, according to the power conversion device 100 having the above-described configuration, the DC current (DC power) which is to flow in the power conversion units 102 (102a to 102n) can be restricted by using the semiconductor switch elements 11 (11a to 11n). At the same time, the power conversion device 100 having the above-described configuration can rapidly disconnect the power conversion unit 102 (102a to 102n) where the short-circuit fault occurs from the DC power supply unit 1 by using the semiconductor switch elements 11 (11a to 11n) at the time of detection of the short-circuit current. Therefore, it is possible to obtain excellent effects in terms that the configuration is simple and the operation response characteristics of the power conversion units 102 (102a to 102n) in normal operation are not sacrificed.

Figure 2:
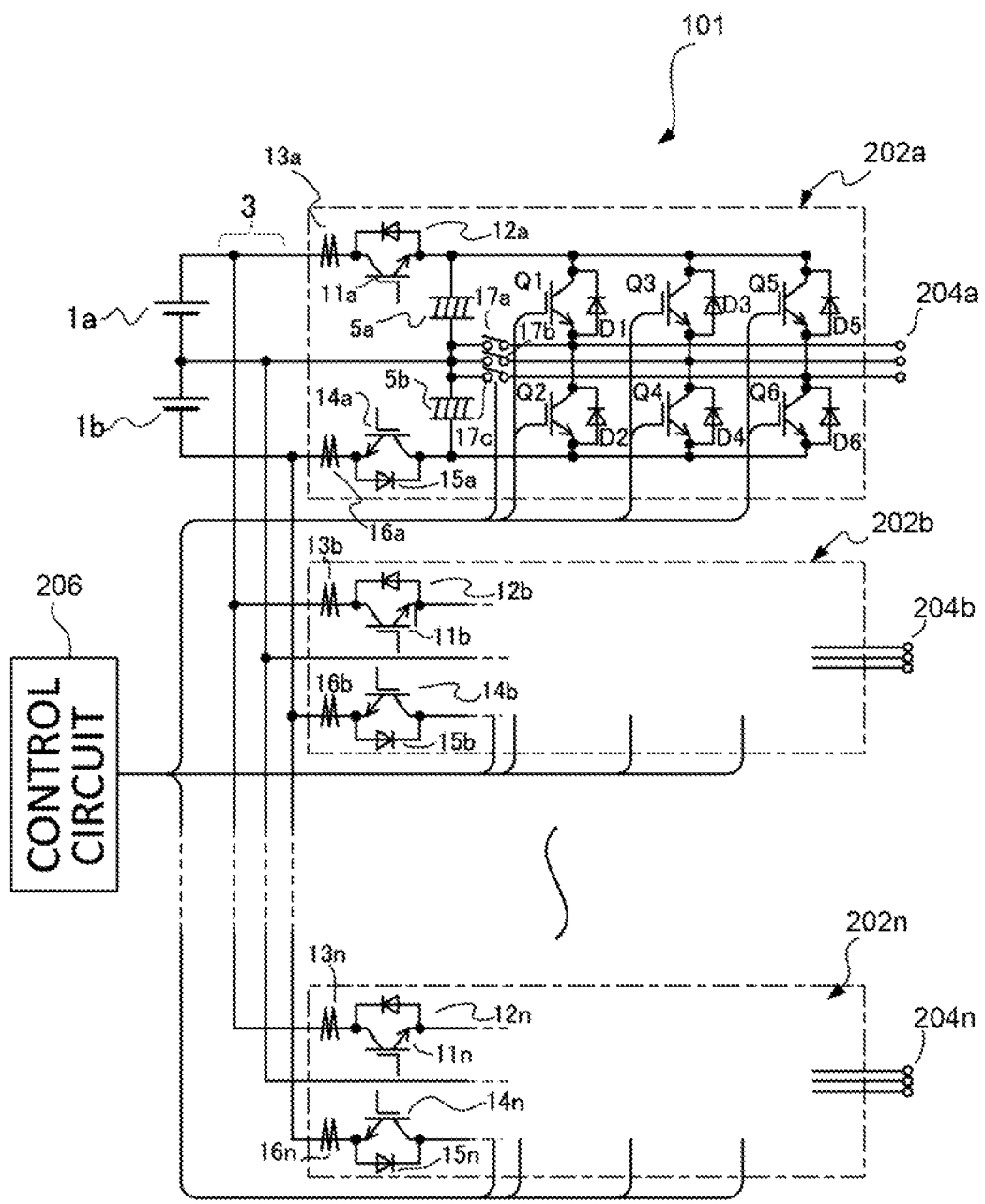
FIG. 2 is a schematic configurational diagram illustrating main components of a power conversion device according to another embodiment of the invention.

In a case where the main body of each of the power conversion units 202 (202a to 202n) is configured with, for example, a three-level inverter as illustrated in FIG. 2, the following configuration is preferred. In addition to the configuration where each semiconductor switch element 11 (11a to 11n) is provided in series to the positive electrode side of each DC input portion of each of the power conversion units 202 (202a to 202n), each semiconductor switch element 14 (14a to 14n) is provided in series to the negative electrode side of each DC input portion. Herein, the three-level inverter is also referred to as a neutral point clamp inverter.

Namely, schematically, the three-level inverter inputs a central point voltage obtained by dividing the DC output voltage of the DC power supply unit 1 by two, the aforementioned positive-electrode voltage, and the aforementioned negative-electrode voltage and switches the DC voltage among these voltages. The output voltages obtained by switching among these voltages are synthesized to generate AC power, which is closer to a sinusoidal wave than that by the inverter illustrated in FIG. 1. The three-level inverter is described in detail in, for example, JP2011-193646A.

In FIG. 2, the reference numeral 15 (15a to 15n) denotes diodes which are connected in reverse parallel with the respective semiconductor switch elements 14 (14a to 14n). In addition, the reference numeral 16 (16a to 16n) denotes current detectors which detect current flowing in the respective semiconductor switch elements 14 (14a to 14n). In addition, the reference numerals 17a, 17b, and 17c denote bidirectional switches for controlling potentials of serial connection points of the respective half-bridge circuits in the three-level inverter.

In FIG. 2, the DC power supply unit 1 is equivalently illustrated as DC power sources 1a and 1b outputting ½ of the DC voltage so that the DC power supply unit outputs the central point voltage which is to be applied to the three-level inverter. In addition, two condensers 5a and 5b which are interposed between the positive-electrode voltage point and the central voltage point and between the central voltage point and the negative-electrode voltage point, respectively, are used in the three-level inverter.

Therefore, in a case where each of the power conversion units 202 (202a to 202n) is configured by using the three-level inverter as the main body, as illustrated in FIG. 2, the semiconductor switch elements 11 (11a to 11n) and 14 (14a to 14n) are provided at the positive electrode side and the negative electrode side in each of the DC input portions of the power conversion units 202 (202a to 202n), respectively. Therefore, according to the short-circuit fault at the upper arm side or the lower arm side of each half-bridge circuit, the semiconductor switch elements 11 (11a to 11n) of the positive electrode side or the semiconductor switch elements 14 (14a to 14n) of the negative electrode side are controlled to be turned off. Accordingly, the power conversion unit 202 (202a to 202n) may be disconnected from the respective DC power sources 1a and 1b of the DC power supply unit 1.

In this case, at the same time when the power conversion unit 202 (202a to 202n) where the short-circuit fault occurs is disconnected from one of the DC power sources 1a and 1b of the DC power supply unit 1, under the control of the control circuit 206, the power conversion unit 202 (202a to 202n) is preferably disconnected from the other one of the DC power sources 1a and 1b. By doing so, the power conversion unit 202 (202a to 202n) where the short-circuit fault occurs can be completely disconnected from the DC power supply unit 1. In addition, similarly to the above-described embodiment, the other faultless power conversion units 202 (202a to 202n) can continue to be stably operated.

The invention is not limited to the above-described embodiments. For example, although depending on a power amount of the power conversion units 202 (202a to 202n), MOS-FETs or bipolar transistors may be used as the semiconductor switch elements 11 (11a to 11n) and 14 (14a to 14n). Furthermore, switching elements using SiC (silicon carbide) elements may be employed. In addition, in the embodiments, the short-circuit current is detected from the current flowing in the power conversion unit 202 (202a to 202n) by the current detectors 13 (13a to 13n) and 16 (16a to 16n) installed in the DC input portions of the power conversion units 2 (2a to 2n).

However, in the case of using the IGBTs having current sense terminals as the semiconductor switching elements Q1 to Q6, the occurrence of the short-circuit current can be monitored by directly detecting the current flowing from the current sense terminal into the semiconductor switching elements Q1 to Q6. Alternatively, the short-circuit of the semiconductor switching elements Q1 to Q6 may be detected based on the DC voltages applied to the semiconductor switching elements Q1 to Q6, for example, collector voltages of the IGBTs.

In addition, as well as the power conversion units 202 (202a to 202n) generating a three-phase AC power, the invention can be applied to power conversion units 202 (202a to 202n) generating a single-phase AC power or other power conversion devices where the power conversion circuits are provided in parallel with each other. In addition, in the embodiments, in the control circuit 206, the short-circuit of the power conversion units 202 (202a to 202n) is detected, and the semiconductor switch elements (11a to 11n) and 14 (14a to 14n) are controlled to be turned on and off. However, the function of controlling the semiconductor switch elements 11 (11a to 11n) and 14 (14a to 14n) to be turned on and off according to the detection of the short-circuit may be provided to each of the power conversion units 202 (202a to 202n). The invention can be embodied in various modifications without departing from the spirit of the invention.

EXPLANATIONS OF LETTERS OR NUMERALS

1: DC power supply unit
1a, 1b: DC power source 102 (2a to 2n): power conversion unit
3: DC link portion
5, 5a, 5b: condenser
106: control circuit
100, 101: power conversion device
11 (11a to 11n): semiconductor switch element
12 (12a to 12n): diode
13 (13a to 13n): current detector
14 (14a to 14n): semiconductor switch element
15 (15a to 15n): diode
16 (16a to 16n): current detector
17a, 17b, 17c: bidirectional switch
Q1 to Q6: semiconductor switching element
D1 to D6: freewheeling diode

The invention claimed is:

1. A power conversion device comprising:
a DC power supply unit;
a plurality of power conversion units which are provided in parallel with each other through a DC link portion to convert DC power supplied from the DC power supply unit to AC power and output the AC power;
a plurality of semiconductor switch elements each interposed between each of the plurality of power conversion units and the DC power supply unit, each of the plurality of semiconductor switch elements being provided in a forward direction with respect to a flowing direction of a current inherent to the DC power supply from the DC power supply unit to each of the plurality of power conversion units to individually restrict or block the DC power supplied to the each of the plurality of power conversion units; and
a control circuit which monitors an occurrence of a short-circuit current occurring in each of the plurality of power conversion units and controls a semiconductor switch element, of the plurality of semiconductor switch elements, connected to a power conversion unit, of the plurality of power conversion units, where the short-circuit current occurs to be turned off to stop the DC power supply to the short-circuited power conversion unit and to electrically disconnect the short-circuited power conversion unit from the DC link portion so as to maintain operations of other remaining power conversion units, of the plurality of power conversion units, where no short-circuit occurs,
wherein the control circuit detects the short-circuit current of the power conversion unit based on a decrease in a voltage of a smoothing capacitor installed between the DC link portion and the short-circuited power conversion unit caused by a short-circuited semiconductor switching element constituting a main body of the power conversion unit or an increase in a current flowing into the short-circuited power conversion unit from the DC link portion in accordance with the voltage decrease, and turns off the semiconductor switch element corresponding to the short-circuited power conversion unit.

2. The power conversion device according to claim 1, wherein each of the plurality of power conversion units is an inverter unit which generates a three-phase AC power.

3. The power conversion device according to claim 1, wherein each of the plurality of semiconductor switch elements is provided in both a positive electrode side and a negative electrode side of a DC input portion of each of the plurality of power conversion units.

4. The power conversion device according to claim 1, wherein each of the plurality of semiconductor switching elements is an insulated-gate bipolar transistor (IGBT) having a current sense terminal and an emitter terminal, and the control circuit monitors the occurrence of the short-circuit current by further detecting the current flowing through the current sense terminal of the respective one of the plurality of semiconductor switching elements.

5. The power conversion device according to claim 1, wherein each of the plurality of semiconductor switching elements is an insulated-gate bipolar transistor (IGBT), and the control circuit monitors the occurrence of the short-circuit current further based on collector voltages of the respective IGBTs.

* * * * *